United States Patent
Chen et al.

(10) Patent No.: US 8,976,257 B2
(45) Date of Patent: Mar. 10, 2015

(54) AUTOMATIC EXPOSURE CALIBRATION AND COMPENSATION FOR MACHINE VISION

(75) Inventors: Mo Chen, Manlius, NY (US); Chun Jia, Manlius, NY (US)

(73) Assignee: Jadak, LLC, North Syracuse, NY (US)

( * ) Notice: Subject to any disclaimer, the term of this patent is extended or adjusted under 35 U.S.C. 154(b) by 251 days.

(21) Appl. No.: 13/562,894

(22) Filed: Jul. 31, 2012

(65) Prior Publication Data
US 2014/0036092 A1   Feb. 6, 2014

(51) Int. Cl.
*H04N 5/235* (2006.01)
*G06K 9/38* (2006.01)

(52) U.S. Cl.
USPC ........ 348/222.1; 348/362; 382/270; 382/271; 382/272; 382/273; 382/274

(58) Field of Classification Search
USPC .................. 348/222.1, 362; 382/270–274
See application file for complete search history.

(56) References Cited

U.S. PATENT DOCUMENTS

2009/0141139 A1*  6/2009  Takahashi et al. ......... 348/222.1

* cited by examiner

*Primary Examiner* — Joel Fosselman
(74) *Attorney, Agent, or Firm* — David L. Nocilly; Bond Schoeneck & King, PLLC

(57) ABSTRACT

An automatic process for calibrating the optical image exposure value to compensate for changes in machine vision systems to maintain optimal exposure of captured images and adjust for the different characteristics among cameras components, such as imaging sensor sensitivity, LED strength, external lighting, reflective functions of any background material, different external lighting conditions, possible changes or updates of the systems over the years, such as LED changes, and even the aging of camera sensor and LEDs over time. A series of images of a target are captured with a predetermined sequence of exposure values, the saturation exposure percentage of a region of interest is calculated in each of the images, and the saturation exposure percentages are compared to determine the exposure value that has a saturation exposure percentage that varies the least from the saturation exposure value of the preceding and following exposure values.

16 Claims, 8 Drawing Sheets

FIGURE 1(A)-(J)

AUTOMATIC EXPOSURE CALIBRATION AND COMPENSATION FOR MACHINE VISION

BACKGROUND OF THE INVENTION

1. Field of the Invention

The present invention relates to optical imaging and, more particularly, to a system and method for automatic exposure calibration and compensation for degradation over time.

2. Description of the Related Art

The appropriate exposure value plays an important role in the acquisition of optical images, particular, when those images are to be further processed for machine vision and barcode decoding. For example, machine vision based systems are used for test tube and container identification and processing in sample handling systems as well as for barcode identification. Whether the exposure value is set correct has strong relationship with the robustness and accuracy of any machine vision algorithms. Setting and maintaining the optimal exposure is complicated, however, due to the different characteristics of cameras components, such as imaging sensor sensitivity, LED strength, and surroundings, such as external lighting, and reflective nature of background material and due to the fact that these characteristics can change over time. Accordingly, there is a need for a way to automatically calibrate exposure value and compensate for changes in the relevant characteristics over time.

BRIEF SUMMARY OF THE INVENTION

The present invention provides a system for automatically calibrating exposure value in a manner that will compensate for changes in system characteristics as required to maintain optimal exposure values. The present invention can adjust for the different characteristics among cameras components, such as imaging sensor sensitivity, LED strength, external lighting, reflective functions of any background material, different external lighting conditions, possible changes or updates of the systems over the years, such as LED changes, and even the aging of camera sensor and LEDs over time. The automatic exposure calibration process involves capturing a series of images of a target with a predetermined sequence of exposure values, calculating the saturation exposure percentage in each of the images, plotting the saturation exposure percentages, and determining the optimal exposure value based on the exposure value that has a saturation exposure percentage that varies the least from the saturation exposure value of the preceding and following exposure values.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 1(A)-(J) is a series of images captured at different exposure levels according to the present invention;

Figure 8:
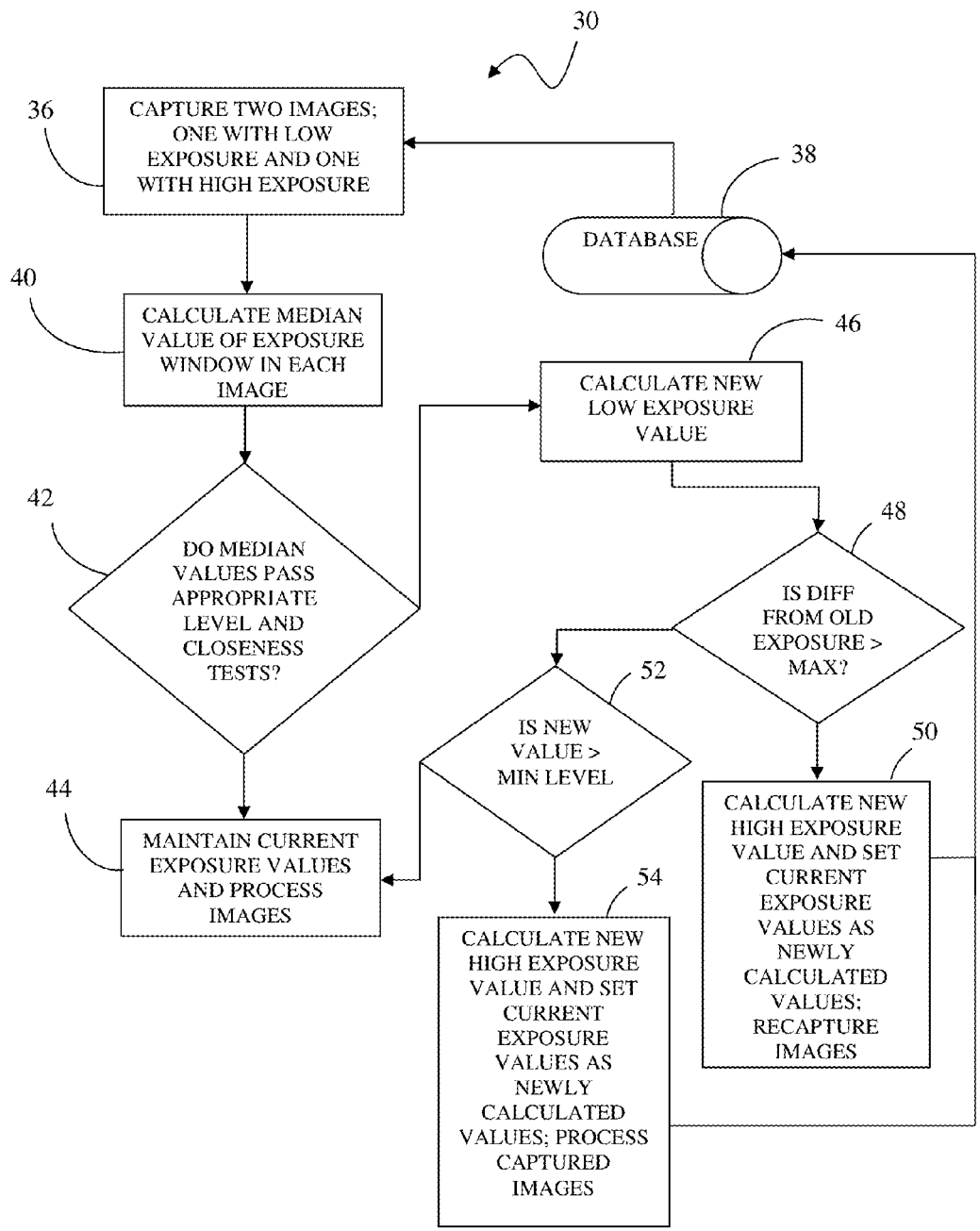

another captured image showing an adaptive exposure process according to the present invention; and FIG. 8 is a flowchart of an adaptive exposure process according to the present invention.

DETAILED DESCRIPTION OF THE INVENTION

Referring now to the drawings, wherein like reference numerals refer to like parts throughout, the present invention comprises a method for calibrating a machine vision system to use the optimal imager exposure value for current system condition. The optimal exposure value should provide an image that is uniform, with a fully saturated background, and illustrate any objects therein with fully formed or connected boundaries.

There is seen in FIG. 1(A)-(J) a series of captured optical images of a 100×12 mm empty tube under different exposure values (E) from, as an example, 30 to 120 for use in connection with a machine vision system, that demonstrate the affect of different exposure values on a particular system. The imager used to capture the images seen in FIG. 1(A)-(J) may comprise any off-the-shelf optical imager capable of capturing digital images of a target that may be further processed for barcode and/or shape recognition and may optionally include onboard or separate illumination sources, such as LEDs. For example, Honeywell Imaging and Mobility of Skaneateles Falls, N.Y. sells a 5×80 series of imagers are capable of scanning and decoding most standard barcodes including linear, stacked linear, matrix, OCR, and postal codes. Other acceptable optical imaging platforms may also include the EV12, EV15, EA15, and XA21 imagers available from Intermec Technologies Corporation of Everett, Wash., or any custom imaging packaging sold commercially for incorporation into machine vision or optical imaging systems. It should be recognized by those of skill in the art that the particular model or make optical imaging platforms that may be interfaced with the present invention are not important as long the platform allows for capturing images with different exposure levels.

Figure 1:
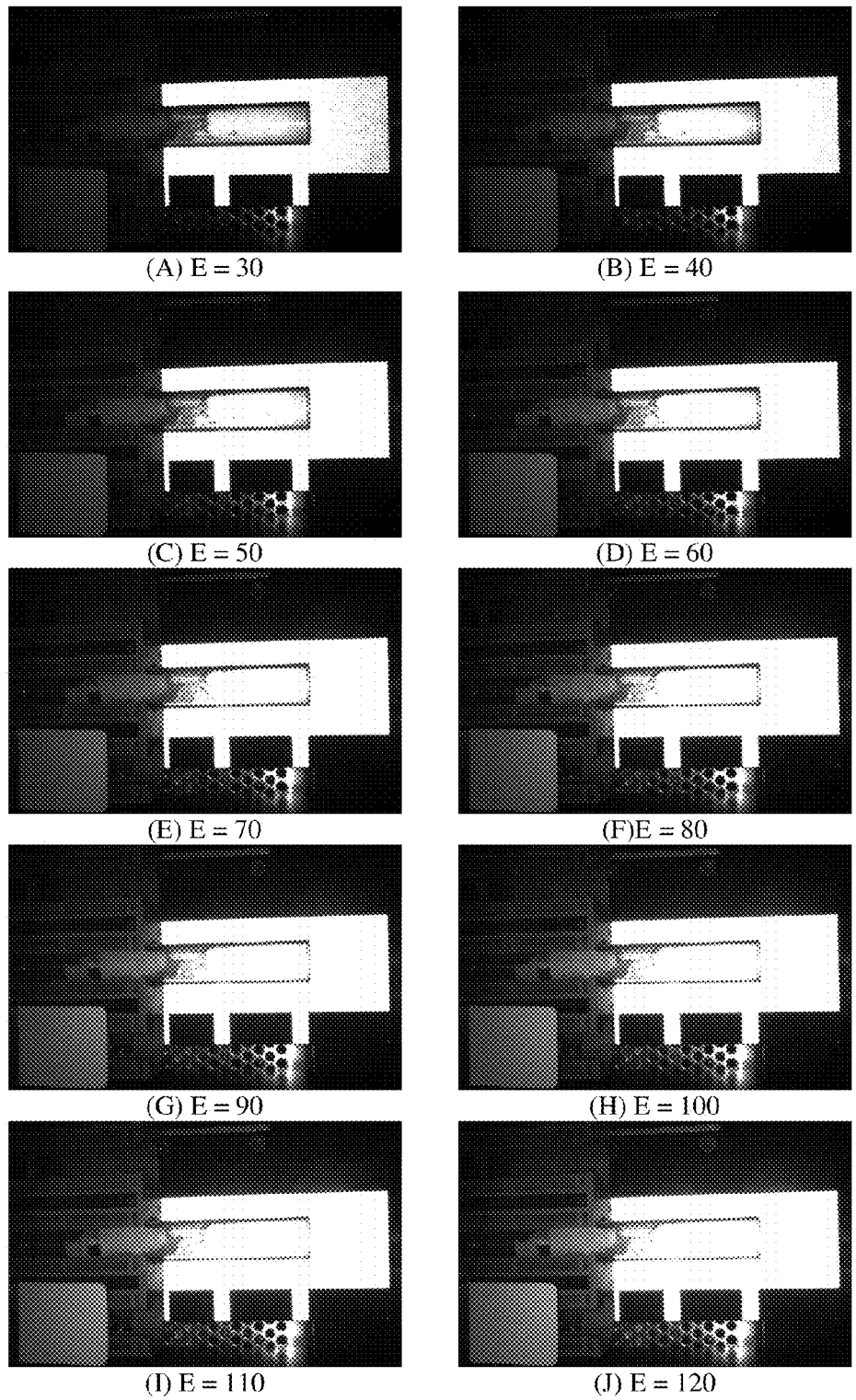

Within the range of exposure values illustrated in FIG. 1, there are exposure values that would adversely impact machine visions processing and other than would provide optimal machine vision processing. For example, if the exposure is set too low, as in the example of E=30 in FIG. 1(A) or E=40 in FIG. 1(B), the accuracy of any machine vision processing algorithms will be adversely affected because the edge of the tube boundary in the captured image is too thick and there is a strong shadow or cloud in the background. On the contrary, if the exposure is set too high, as in E=120 of FIG. 1(I) or E=130 of FIG. 1(J), the accuracy of any machine vision processing algorithms will be adversely affected because the edge of the tube boundary is too thin and potentially disconnected, the contrast between the tube and background is too small, and the tube, and especially the tube boundary, is washed out.

Under the conditions used to capture the images in FIG. 1, the optimal exposure for machine vision processing is closer to E=60, as seen in FIG. 1(D), or E=70, as seen in FIG. 1(E). The optimal exposure provides a uniform and fully saturated background, as well as sharp, fully connected tube boundaries. Accordingly, the present invention encompasses an automatic exposure scheme to determine and implement the appropriate value for under any variety of characteristics and settings.

Figure 2:
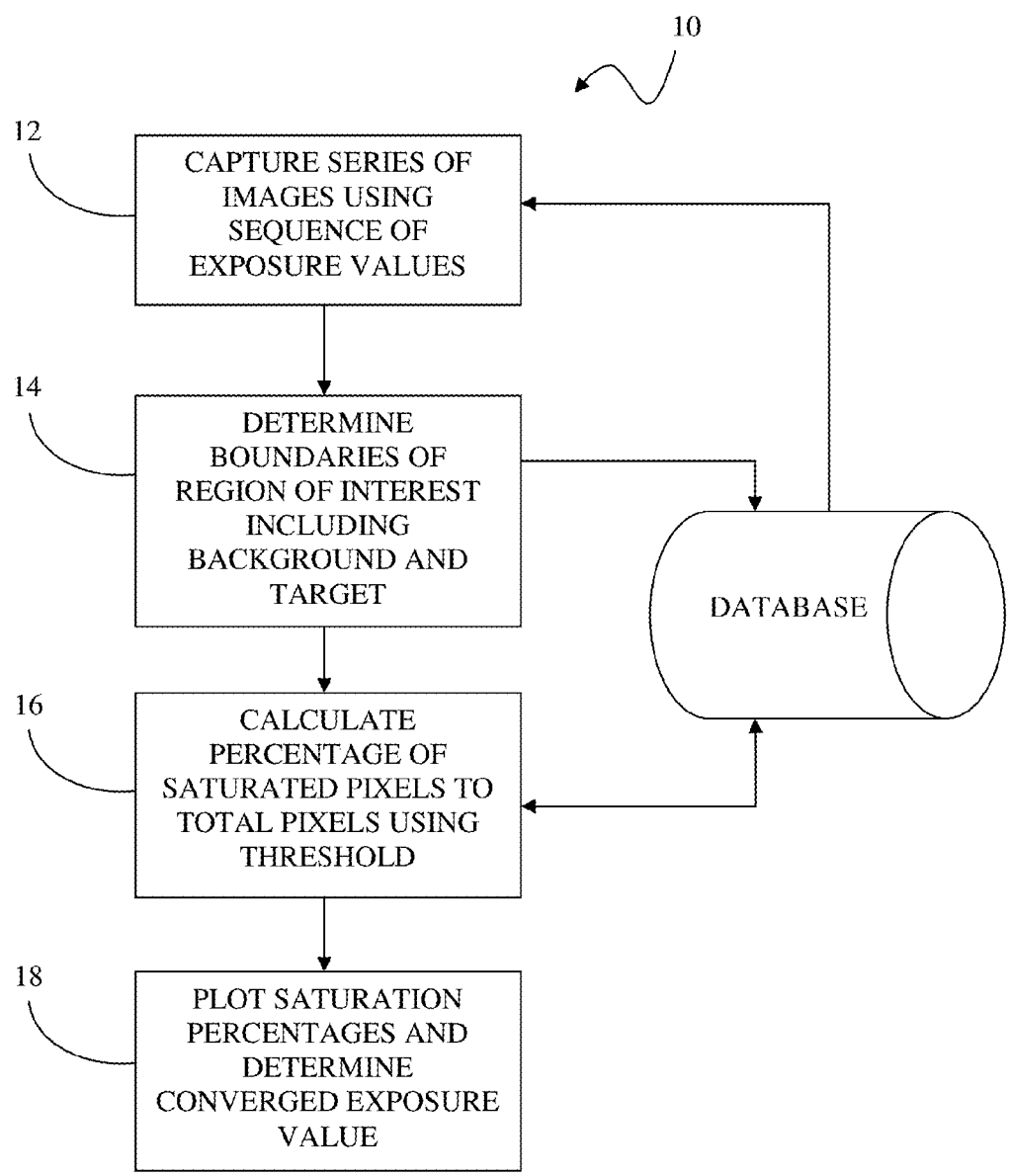
FIG. 2 is a flowchart of the automatic exposure calibration process according to the present invention.

Referring to FIG. 2, a process 10 for determining the optimal exposure value according to the present invention begins with the step of taking a series of snapshots of a target with a predetermined range of exposure values 12, such as E=30 to E=120, that are separated or incremented equally by a fixed amount, such as 10. Process 10 is preferably implemented in a controller that is onboard and forms part of the imager being used to capture images of the target, a separate microcontroller interconnected to the optical imager, or even in a host computer that is capable of sending commands to and communicating with a remotely positioned imager. It should be recognized by those of skill in the art that process 10 may be implemented in software instruction programmed into any of these options depending on the particular needs of the machine vision application. Preferably, this process is installed as a calibration routine that can be performed upon the issuance of a designated calibration command that can be run independently or in combination with other routines, such as decoding or machine vision processing.

The range of exposure values, and distance between the values, may be selected based on an estimate or determination as to the widest possible optimal exposure values. For example, the range may be determined experimentally from a large quantity of the same cameras, or even different types of cameras, in advance of the first implementation of the machine vision system that will be programmed to implement the present invention. The range of exposure values is preferably selected to be large enough to handle all possible varieties and to account to potential degradation of the system during its expected lifespan.

Figure 3:
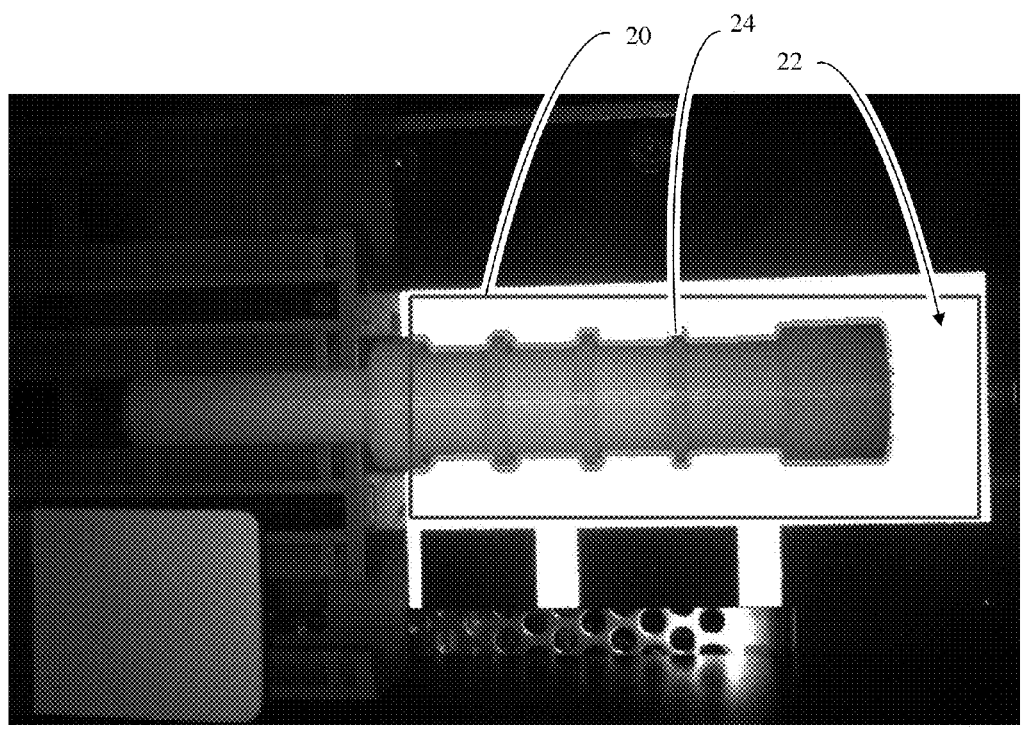
FIG. 3 is a captured image illustrating the identification of a region of interest including a high exposure background and target according to the present invention.

The next step in process 10 is to, using a predetermined one of the high exposure value images (such as E=90), determine certain boundaries in the image 14. The preferred boundaries comprise a region of interest 20 that includes at least a portion of a background region 22, such as the retro-reflective background seen in FIG. 3, as well as the boundaries for a target 24, such as the exemplary test tube of FIG. 3. A retro-reflective background system for improving machine vision processing is described in detailed in U.S. Pat. No. 8,170,322, hereby incorporate by reference in its entirety. The boundaries of region of interest 20, background 22, and target 24 are preferably saved in local memory for later use, as explained below. The high exposure value to be used in this step is selected to ensure a crisp delineation between background 22 and target 24 so that the boundaries can be more easily determined through conventional processes, such as a histogram analysis or edge detection algorithms. By using a high exposure image, the pixels of the background area in the region of interest pixels are more clearly defined as the pixels falling between the region of interest area and the boundary of the region of interest, thereby making the analysis easier.

Next, the percentage of saturated pixels to all of the background pixels in the region of interest is calculated 16. A pixel is deemed to be saturated if its pixel intensity value is above a certain threshold value, such as 250. The threshold value may be stored in memory prior to system implementation and automatically retrieved for use on a period basis or according to a schedule, or possibly input by a user in connection with field servicing of the machine vision system implementing process 10. The percentage may be algorithmically calculated based on the pixel data for the image by applying the threshold and simply dividing the number of pixels that satisfy the threshold by the total number of pixels in the region of interest. The same percentage saturation computation is then performed on all exposure values from the minimum to maximum and stored in local memory.

Figure 4:
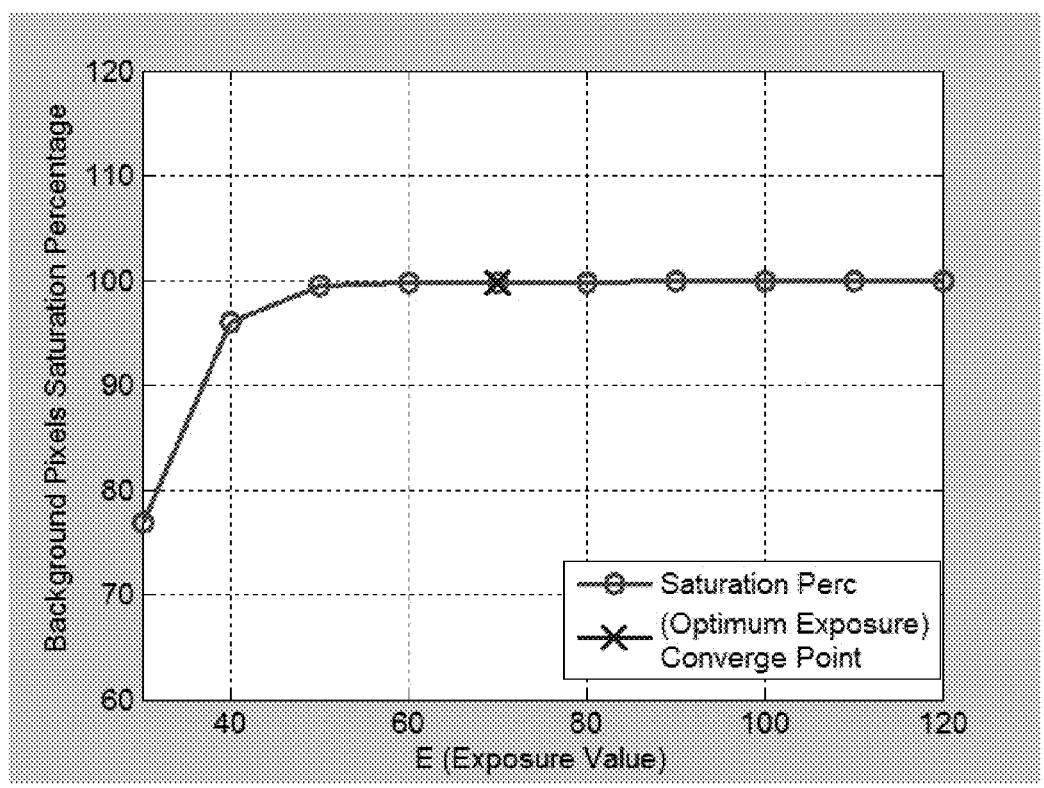
FIG. 4 is a plot of the saturation percentages of a series of images captures at different exposure values according to the present invention.

Once the percentage of saturated pixels for all pixels in each of the exposure values have been calculated and stored in step 16, the percentages may then be plotted to generate a saturation percentage curve 18, as seen in FIG. 4. The optimal exposure value may then be determined based on the exposure value whose background saturation percentage is converged. The converged exposure value is defined as the exposure value where the background saturation percentages do not change materially in the preceding or following exposure value. Convergence may be determined by programming the processor implementing process 10 to calculate the exposure value having the least amount of variance in its saturation percentage with respect to the saturation percentages of adjacent exposure values. Those of skill in the art will appreciate that the plotting and calculating of convergence may be performed automatically and without the need to provide a visual representation of the plot to a user.

Referring to FIG. 4, the optimal exposure value would be E=70, as the saturation value of E=70 does not change materially with respect to E=60 or E=50. Notably, in this example, the background saturation percentage exposure values do not change materially up to E=120, so this particular example provides a range of optimal exposure values. As the characteristics of the imaging system change, the number of optimal exposure values may change dramatically. Accordingly, process 10 may be configured to pick the best exposure value each time or select randomly from any value that provide equal convergent saturation percentages. Thus, a machine vision system 10 may implement process 10 on a regular or period basis and adjust the optimum exposure value to maintain the quality of machine vision processing regarding of changes to the system, variations in the components, or the degradation of components over time. Once the optimal exposure value is determined, that exposure value may be used to configure, or reconfigure, the exposure value in use by the associated imager to ensure the highest quality image possible and maximize the effectiveness of subsequent machine vision processing on acquired images.

Alternatively, process 10 may be performed more rapidly by obtaining a high exposure image, such as E=90, and the computing the boundaries for region of interest 20. Next, a low exposure image, such as E=20, is captured capture the image and the saturation ratio is calculated. The exposure value is then incremented and the saturation ratio is then calculated. The saturation ratios are then tracked and monitored until a converged point is reached.

As explained above, process 10 is preferably implemented as a calibration process. When it is difficult to perform process 10 on a regular basis, there may be need for an adaptive routine that can be performed without user intervention. This adaptive routine may be used to reset the exposure value or simply as a test to determine whether recalibration according to process 10 is necessary. For example, an adaptive routine may be used as a check to see if there some strong external lighting change or whether the illumination that is too dark or too bright.

Figure 5:
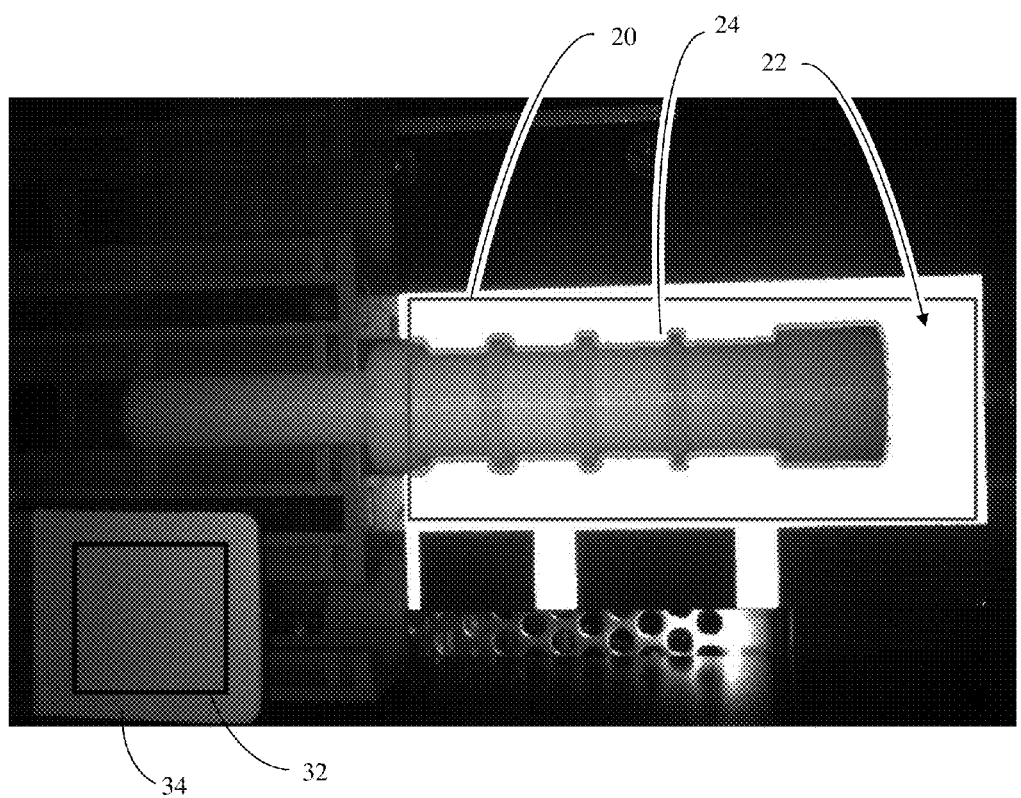
FIG. 5 is a captured image showing an adaptive exposure process according to the present invention.

Referring to FIG. 5, the present invention therefore also includes an adaptive exposure process 30 that may be performed on each captured image to adjust the exposure value on a continuing basis, thereby avoiding the need to implement process 10 on a periodic basis. As seen in FIG. 5, the captured image of FIG. 4 further includes a region of interest identified as exposure window 32 and falling within a calibration label 34. Label 34 is selected to best reflect the intensity change from various external lighting conditions and is preferably yellow in color. Window 32 is positioned to obtain a sample range of intensity pixels of label 34 from which the median value may be calculated mathematically.

Figure 6:
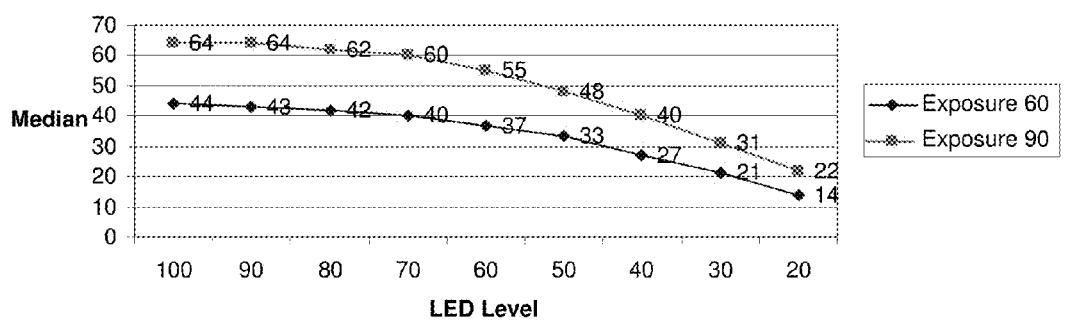
FIG. 6 is graph showing median illumination against degraded LED level over time.

Adaptive exposure process 30 according to the present invention is based on the setting of a target median, which is initially determined by capturing a series of images at a low exposure value, such as 60, with various illumination power levels, such as 20 to 100. Next, a second set of images is captured using a high exposure value, such as 90, along with the same various illumination levels. As seen in FIG. 6, which shows decreasing illumination to simulate degradation of the illumination source (such as LEDs) over time, the computed median at every power level for both series of images may then be plotted to determine how the median decreases as illumination power levels decrease for each exposure value. Notably, the difference between the medians of the low and high exposure values decreases as the illumination level decreases.

Figure 7:
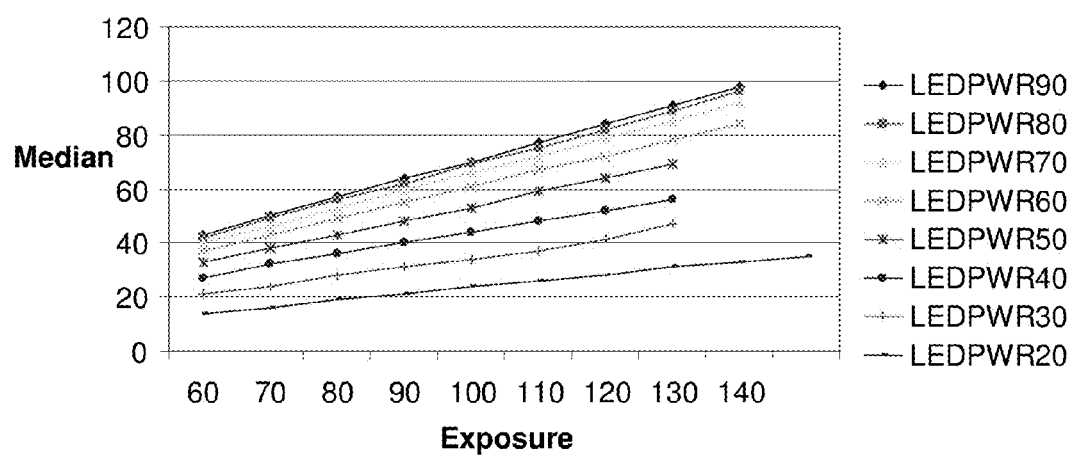
FIG. 7 is a graph of the exposure value and median illumination at different illumination power levels.

As FIG. 6 alone does not give a clear relationship between the changes of the exposure level with respect to the median at different power levels, another set of images are taken at different exposure levels from 60 to 140 at different illumination power levels from 20 to 90. FIG. 7 combines eight plots of these captured images to illustrate the relationship between the exposure value and the median value at different illumination power levels. FIG. 7 shows that the median value is linearly increased with the exposure value on the same illumination power level. It has thus been established that there is a linear relationship between the exposure and median value of the exposure window if the window is not contaminated. Since the illumination power level changes minimally between two consecutive captures of a target, this relationship may be used compute an exposure value that will achieve the target median by using any pair of images that are taken at different exposure level.

Referring to FIG. 8, adaptive exposure process 30 is implemented by capturing two images 36, image IMAGE_H captured at a current high exposure value EXP_HIGH, and image IMAGE_L captured using a current low exposure value EXP_LOW. The current low and high exposure values may be initially selected to represent the acceptable range of exposures that will currently provide the highest quality image. For example, for a newly installed system, the low and high current exposure values may be set at 60 and 90, respectively, such as in default memory 38. In addition, a target median for window 32 of, for example 45, may be also be set as a default. Once default values are set, process 30 may be implemented at any point in the future, or on a regular basis, starting with the default current values as further modified via process 30. Thus, IMAGE_H and IMAGE_L are captured using the then-current high exposure value EXP_HIGH and low exposure value EXP_LOW as the first step in process 30.

After capturing one image at the current low and high exposure values 36, median values of window 32 are then computed for that region of interest in both image IMAGE_H and image IMAGE_L 40, thus resulting in median value of MEDIAN_H from image IMAGE_H and median value of MEDIAN_L for image IMAGE_L. Median values MEDIAN_H and MEDIAN_L may then be evaluated 42 to determine: (i) whether MEDIAN_H and MEDIAN_L are too low or (ii) whether MEDIAN_H and MEDIAN_L are too close to each other. If the tests are passed, then the current exposure value in use is maintained 44 and the images captured at the initial exposure values may be interpreted according to the needs of the particular system.

If either test fails, however, then a failure is noted and a new exposure value must be computed 46 for capturing images that will be of sufficient quality to be processed according to the needs of the particular system. The new low exposure value EXP_LOWNEW is calculated as follows:

$$EXP\_LOWNEW = EXP\_LOW + (TARGET\_MEDIAN - MEDIAN\_L) * (EXP\_HIGH - EXP\_LOW) / (MEDIAN\_H - MEDIAN\_L)$$

If the difference between the newly calculated low exposure value EXP_LOWNEW and the current low exposure value EXP_LOW is greater than the maximum tolerance 48 (for example 30), however, then the new low exposure EXP_LOWNEW is immediately set as low exposure value EXP_LOW and a new high exposure value EXP_HIGH is set as EXP_LOW plus 30 and a pair of new images may then be taken immediately with the new exposure settings 50. Image analysis may then be performed in the newly captured images as the variation from the values used to capture the previously captured images is significant enough that the previously captured images are not likely usable for machine vision processing.

If the difference between the new low exposure value EXP_LOWNEW and the original low exposure value EXP_LOW is greater than a minimal tolerance (for example 5) but less than the maximum tolerance 52, then the new exposure value EXP_LOWNEW is set in memory as the low exposure value EXP_LOW and a new high exposure value EXP_HIGHNEW is calculated as from the original low exposure value EXP_LOW plus 30 and set in memory as a high exposure value EXP_HIGH, and the new exposure settings are then used for the next image capture 46. Image processing analysis on the current images can proceed as the variation was likely not significant enough that the images captured with the old values will be unusable for machine vision processing.

If the difference between the new low exposure value EXP_LOWNEW and the original low exposure value EXP_LOW is less than the minimal tolerance (for example 5), then the current exposure values are maintained and the captured images may be processed 44.

During the calibration process 10, it is possible to record the value MEDIAN_L and MEDIAN_H as initial target values. For each test image captured thereafter, the target values may be compared to the current values, and if the difference exceed as threshold (such as 10), a flag may be set to adjust the exposure values so that the results will be very close to the target values. This flag may be determined using process 30, by a bisect search, or even by a more exhaustive search algorithm like process 10 to determine new exposure values whose MEDIAN_L and MEDIAN_H are as close as possible to the target values.

EXAMPLE

Process 30 was tested using sequentially lower illumination to simulate the degradation of LEDs over time. As seen in Table 1 below, as the LED power decreased, low exposure value EXP_LOW was first adjusted for minor deviations and then major deviations until the LED power reached such a low level, i.e., zero, that adjustment was no longer possible. Default values were as follows: target median 45, minimum tolerance 5 (Minor in Table 1), and a maximum tolerance 30 (Major in Table 1).

TABLE 1

| Led Power | EXP_LOW | Median | Minor (5) | Major (30) | New EXP_LOW |
|---|---|---|---|---|---|
| 100 | 60 | 44 | N | N | 60 |
| 80 | 60 | 43 | N | N | 60 |
| 60 | 60 | 38 | Y | N | 71 |
| 50 | 71 | 39 | Y | N | 82 |
| 40 | 82 | 37 | Y | N | 100 |
| 20 | 100 | 31 | Y | Y | 190 |
| 20 | 190 | — | — | — | 190 |
| 10 | 190 | 29 | Y | Y | 340 |
| 10 | 340 | — | — | — | 340 |
| 0 | 340 | NA | NA | NA | 340 |

What is claimed is:

1. A method for automatically setting the optimal exposure for capturing a digital image, comprising the steps of:
   capturing a series of digital images having an array of pixels, wherein each image is captured using a different exposure value;
   determining a set of boundaries defining a region of interest that includes at least of a portion of a target image and a background region;
   calculating a background saturation percentage for each image based upon the percentage of pixels falling within the background region that exceed a saturation threshold relative to the total number of pixels falling within in the background region;
   identifying the exposure value associated with the image having a converged background saturation percentage.

2. The method of claim 1, wherein the different exposure values fall within a predetermined range and are evenly incremented.

3. The method of claim 2, wherein the step of determining a set of boundaries defining a region of interest that includes at least of a portion of a target image and a background region is performed on the digital image having one of the highest exposure values.

4. The method of claim 3, wherein the step of determining a set of boundaries defining a region of interest that includes at least of a portion of a target image and a background region is performed on the digital image having the highest exposure value.

5. The method of claim 3, wherein the saturation threshold is 250.

6. The method of claim 5, wherein the converged background saturation percentage comprises the exposure value having a background saturation percentage that varies the least from adjacent exposure values.

7. A machine vision system having an automatic exposure control, comprising:
   an optical image for capturing digital images having an array of pixels;
   a microcontroller associated with the optical imager;
   wherein the microcontroller is programmed to capture a series of digital images having an array of pixels, wherein each image is captured using a different exposure value, determine a set of boundaries defining a region of interest in one of said images that includes at least of a portion of a target image and a background region, calculate a background saturation percentage for each image based upon the percentage of pixels falling within the background region that exceed a saturation threshold relative to the total number of pixels falling within in the background region, identify the exposure value associated with the image having a converged background saturation percentage.

8. The system of claim 7, wherein the different exposure values fall within a predetermined range and are evenly incremented.

9. The system of claim 8, wherein the step of determining a set of boundaries defining a region of interest that includes at least of a portion of a target image and a background region is performed on the digital image having one of the highest exposure values.

10. The system of claim 9, wherein the step of determining a set of boundaries defining a region of interest that includes at least of a portion of a target image and a background region is performed on the digital image having the highest exposure value.

11. The system of claim 9, wherein the saturation threshold is 250.

12. The system of claim 11, wherein the converged background saturation percentage comprises the exposure value having a background saturation percentage that varies the least from adjacent exposure values.

13. A method for automatically setting the optimal exposure for capturing a digital image, comprising the steps of:
   capturing a first image at a first exposure value;
   capturing a second image at a second exposure value;
   calculating a first median pixel intensity in at least a portion of said first image;
   calculating a second median pixel intensity in a corresponding portion of said second image;
   determining whether the said first median pixel intensity and said second median pixel intensity satisfy a predetermined condition;
   changing said first predetermined exposure value and said second predetermined exposure value if said different exceeds said threshold.

14. The method of claim 13, wherein said predetermined condition comprises said first median pixel intensity and said second median pixel intensity falling below a threshold.

15. The method of claim 14, wherein said predetermined condition comprises the difference between said first median pixel intensity and said second median pixel intensity falling below a threshold.

16. The method of claim 14, wherein said predetermined condition comprises the difference between said first median pixel intensity and said second median pixel intensity falling below a threshold and said first median pixel intensity and said second median pixel intensity falling below a threshold.

* * * * *